(12) United States Patent
Hasunuma et al.

(10) Patent No.: US 9,353,884 B2
(45) Date of Patent: May 31, 2016

(54) FLOW REGULATING APPARATUS

(71) Applicant: Surpass Industry Co., Ltd., Saitama (JP)

(72) Inventors: Masahiro Hasunuma, Saitama (JP); Shouichi Sakata, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 59 days.

(21) Appl. No.: 14/282,287

(22) Filed: May 20, 2014

(65) Prior Publication Data

US 2014/0346385 A1 Nov. 27, 2014

(30) Foreign Application Priority Data

May 22, 2013 (JP) ................................. 2013-108018

(51) Int. Cl.
| | |
|---|---|
| *F16K 1/52* | (2006.01) |
| *F16K 31/143* | (2006.01) |
| *F16K 31/50* | (2006.01) |
| *F16K 31/122* | (2006.01) |
| *F16K 7/16* | (2006.01) |
| *F16K 7/17* | (2006.01) |

(52) U.S. Cl.
CPC ............... *F16K 31/506* (2013.01); *F16K 1/523* (2013.01); *F16K 7/16* (2013.01); *F16K 7/17* (2013.01); *F16K 31/1221* (2013.01); *F16K 31/143* (2013.01)

(58) Field of Classification Search
USPC ............. 251/14, 60, 266, 270, 272, 273, 274, 251/275, 277, 278, 285, 288
See application file for complete search history.

(56) References Cited

U.S. PATENT DOCUMENTS

| | | | | |
|---|---|---|---|---|
| 421,308 | A | * | 2/1890 | Reynolds ................ F41B 11/72 124/75 |
| 2,733,041 | A | * | 1/1956 | Crookston ............ F16K 31/143 251/14 |
| 2,809,799 | A | * | 10/1957 | Cunningham, Jr. ... F16K 47/023 251/14 |
| 2,966,170 | A | | 12/1960 | Raulins |

(Continued)

FOREIGN PATENT DOCUMENTS

| | | |
|---|---|---|
| DE | 10 2009 027106 A1 | 1/2011 |
| FR | 2 593 260 | 7/1987 |
| JP | 2006-153039 | 6/2006 |

OTHER PUBLICATIONS

European Search Report dated Jul. 2, 2014 from European Patent Application No. 11004275.1, pp. 1-6.

(Continued)

*Primary Examiner* — Mary McManmon
*Assistant Examiner* — Jonathan Waddy
(74) *Attorney, Agent, or Firm* — MH2 Technology Law Group, LLP

(57) ABSTRACT

Provided is a flow regulating apparatus 100 including a flow regulating mechanism including: a flow regulation knob 3; a screw rod 10 that adjusts an insertion amount of a diaphragm needle 5 into a valve hole 32; and a spring roll pin 13 that is fixed to the flow regulation knob 3, wherein the screw rod 10 includes a first male threaded portion that is fastened to a female threaded portion 9a formed on an inner circumferential surface of a cover section 9, and a through hole 10d penetrating in the direction substantially perpendicular to the center axis C and having a predetermined width in the direction of the center axis C, and the spring roll pin 13 is inserted into the through hole 10d.

4 Claims, 9 Drawing Sheets

(56) References Cited

U.S. PATENT DOCUMENTS

| | | | | |
|---|---|---|---|---|
| 6,481,460 | B2* | 11/2002 | Fukano | F16K 37/0033 137/554 |
| 6,994,312 | B2* | 2/2006 | Pauer | F02M 63/0015 251/129.18 |
| 7,337,805 | B2* | 3/2008 | Brown | F16K 7/14 137/625.33 |
| 2005/0035325 | A1* | 2/2005 | Balasubramanian | F16K 7/126 251/331 |
| 2005/0253100 | A1 | 11/2005 | Yasue et al. | |
| 2008/0111089 | A1 | 5/2008 | Hasunuma | |

OTHER PUBLICATIONS

European Search Report dated Sep. 24, 2014 from European Patent Application No. 14168397.9, pp. 1-6.

Communication dated Oct. 13, 2015 from European Patent Application No. 14 168 397.9, pp. 1-5.

* cited by examiner

FLOW REGULATING APPARATUS

CROSS-REFERENCE TO RELATED APPLICATIONS

This application is based on Japanese Patent Application No. 2013-108018, the contents of which are incorporated herein by reference in its entirety.

TECHNICAL FIELD

The present invention relates to a flow regulating apparatus.

BACKGROUND ART

Conventionally, a flow regulating apparatus including a main body section provided with a valve hole, and a needle valve inserted into the valve hole has been known (for example, see Patent Literature 1).

The flow regulating apparatus disclosed in Patent Literature 1 includes a main body section where a threaded portion is formed on an inner circumferential surface and a needle valve were another threaded portion is formed so as to be fastened to the threaded portion of the main body section. The needle valve is coupled to a knob section. When the knob section is rotated, the needle valve moves in an axial direction. A gap formed between an inner circumferential surface of a valve hole and an outer circumferential surface of the needle valve is adjusted according to the axial movement of the needle valve. A flow rate of a fluid is thereby regulated.

CITATION LIST

Patent Literature

{PTL 1}
Japanese Unexamined Patent Application, Publication No. 2006-153039

SUMMARY

Technical Problem

In the flew regulating apparatus disclosed in Patent Literature 1, the needle valve and the flow regulating knob are integrally coupled together, so that a moving amount of the needle valve and a moving amount of the flow regulating knob correspond to each other. Therefore, in order to move the needle valve from the valve hole by a predetermined distance to increase the flow rate of a fluid, the flow regulating knob needs to be moved by the same distance.

In the flow regulating apparatus disclosed in Patent Literature 1, when the flow regulating knob is moved according to the regulation of the flow rate, an entire height of the flow regulating apparatus is changed. Thus, it is necessary to install the flow regulating apparatus by previously considering a moving range of the flow regulating knob. Consequently, the flew regulating apparatus cannot be sufficiently reduced in size.

In the flow regulating apparatus disclosed in Patent Literature 1, the position of the flow regulating knob is changed when the flow regulating knob moves in a center axis direction of the needle valve. Thus, the position of the flew regulating knob is not fixed, and operability in flow regulation is deteriorated.

As disclosed herein, a flow regulating apparatus with improved operability in flow regulation and with a reduced size is provided.

Solution to Problem

To achieve the above object, the present disclosure employs the following solution.

A flow regulating apparatus according to the present disclosure includes a valve body section where a projection portion is provided at a distal end; a main body section where a valve chamber is formed so as to house the valve body section; a valve hole that allows the projection portion to be inserted therein, and brings an inflow channel for a fluid and the valve chamber into communication with each other; and a flow regulating mechanism that adjusts an insertion amount of the projection portion into the valve hole to regulate a flow rate of a fluid flowing into the valve chamber from the valve hole, wherein the flow regulating mechanism includes a knob section that rotates around a center axis of the valve body section according to en operation by an operator, a rod member that extends along the center axis, and adjusts the insertion amount by moving in a direction of the center axis, and a pin member that is fixed to the knob section, and extends in a direction substantially perpendicular to the center axis, the rod member including a first threaded portion that is fastened to a body-side threaded portion formed on an inner circumferential surface of the main body section, and a through hole penetrating in the direction substantially perpendicular to the center axis and having a predetermined width according to a moving range of the valve body section in the direction of the center axis, and the pin member being inserted into the through hole.

In accordance with the flow regulating apparatus of the present disclosure, when the knob section is rotated around the center axis of the valve body section according to an operation by an operator, the pin member fixed to the knob section rotates around the center axis. Since the pin member is inserted into the through hole formed in the rod member that extends along the center axis, the rod member rotates around the center axis according to the rotation of the pin member. Since the first threaded portion of the rod member is fastened to the body-side threaded portion formed on the inner circumferential surface of the main body section, the rod member moves along the center axis when the rod member rotates around the center axis.

The rod member also includes the through hole having the predetermined width according to the moving range of the valve body section in the direction of the center axis. Therefore, in a range in which the pin member does not contact an end portion of the through hole in the direction of the center axis, the rod member can be moved along the center axis with the pin member fixed at a given position. When the rod member is moved in the direction of the center axis, the insertion amount of the projection portion provided at the distal end of the valve body section into the valve hole is adjusted.

Accordingly, the flow rate can be regulated with the knob section fixed at a given position. The flow regulating apparatus with improved operability in flow control and with a reduced size can be thereby provided.

The flow regulating apparatus according to a first aspect of the present disclosure further includes a cylindrical moving member that is arranged coaxially with the valve body section, and a restriction member that restricts rotation of the moving member around the center axis, wherein the rod member includes a second threaded portion that is fastened to a moving member threaded portion formed on an inner circumferential surface of the moving member at a distal end portion closer to the valve hole than the first threaded portion, a pitch of the second threaded portion being smaller than a pitch of the first threaded portion.

In accordance with the flow regulating apparatus according to the first aspect of the present disclosure, when the knob section is rotated one revolution, the rod member rotates one revolution around the center axis to move by a distance according to the pitch of the first threaded portion. Since the rotation around the center axis of the moving member where the moving member threaded portion fastened to the second threaded portion is formed on the inner circumferential surface is restricted by the restriction member, the moving member moves in a direction opposite to a moving direction of the rod member. A relative moving amount of the moving member with respect to the rod member is a distance corresponding to the pitch of the second threaded portion. The distance is smaller than a moving amount of the rod member. Therefore, an absolute moving amount of the moving member corresponds to a difference between the pitch of the first threaded portion and the pitch of the second threaded portion.

Accordingly, the moving amount of a distal end portion of the moving member is made smaller than the moving amount of the rod member, so that the moving amount of the distal end portion of the moving member can be finely adjusted. Since the insertion amount of the projection portion of the valve body section into the valve hole is adjusted by the position of the distal end portion of the moving member, the flow rate can be finely regulated.

In the flow regulating apparatus according to a second aspect of the present disclosure, a diameter of an outer circumferential surface of the moving member is smaller than a diameter of the inner circumferential surface of the main body section.

Accordingly, the moving member is housed in a region of a gap between the inner circumferential surface of the main body section and the rod member, thereby reducing the size of the flow regulating apparatus.

The flow regulating apparatus according to a third aspect of the present disclosure further includes a piston section that is movable in the direction of the center axis along with the valve body section, and a spring section that gives a first urging force in a direction to bring the valve body section close to the valve hole to the valve body section via the piston section, wherein an air introduction port is formed in the main body section so as to introduce compressed air from outside, a second urging force in a direction to bring the valve body section away from the valve hole is generated on the valve body section via the piston section by the compressed air introduced into a pressure chamber in communication with the air introduction port, the moving member and the piston section are separated from each other when the first urging force exceeds the second urging force, and the moving member and the piston section come into contact with each other when the second urging force exceeds the first urging force.

In accordance with the flow regulating apparatus according to the third aspect of the present disclosure, since the first urging force in the direction to bring the valve body section close to the valve hole is given from the spring section, the flow regulating apparatus comes into a fully-closed state in which the valve body section contacts the valve hole in a normal state in which no compressed air is introduced into the pressure chamber (normal close type). When the compressed air is introduced into the pressure chamber from the air introduction port, the second urging force in the direction to bring the valve body section away from the valve bolo is generated. When the second urging force exceeds the first urging force, the valve body section is separated from the valve hole, so that the flow regulating apparatus comes into an open state. The piston section coupled to the valve body section comes into contact with the moving member to define the position of the valve body section. Therefore, the insertion amount of the projection portion provided at the distal end of the valve body section into the valve hole is adjusted by the position of the moving member. An opening degree of the valve body section separated from the valve hole by the second urging force when the flow regulating apparatus is in a fully-open state corresponds to the position of the moving member.

Accordingly, the opening degree of the valve body section when the normal close-type flow regulating apparatus is in the fully-open state can be adjusted to an appropriate opening degree according to the position of the moving member.

BRIEF DESCRIPTION OF DRAWINGS

FIG. 7A is a partial sectional view on arrow B-B of the screw rod and the moving body shown in FIG. 4; FIG. 7B is a partial sectional view on arrow D-D of the screw rod and the moving body shown in FIG. 5; and FIG. 7C is a partial sectional view on arrow E-E of the screw rod and the moving body shown in FIG. 6.

FIG. 8A is a partial sectional view of the screw rod and the moving body shown in FIG. 4; FIG. 8B is a partial sectional view of the screw rod and the moving body shown in FIG. 5; and FIG. 8C is a partial sectional view of the screw rod and the moving body shown in FIG. 6.

DESCRIPTION OF EMBODIMENTS

First Embodiment

Figure 1:
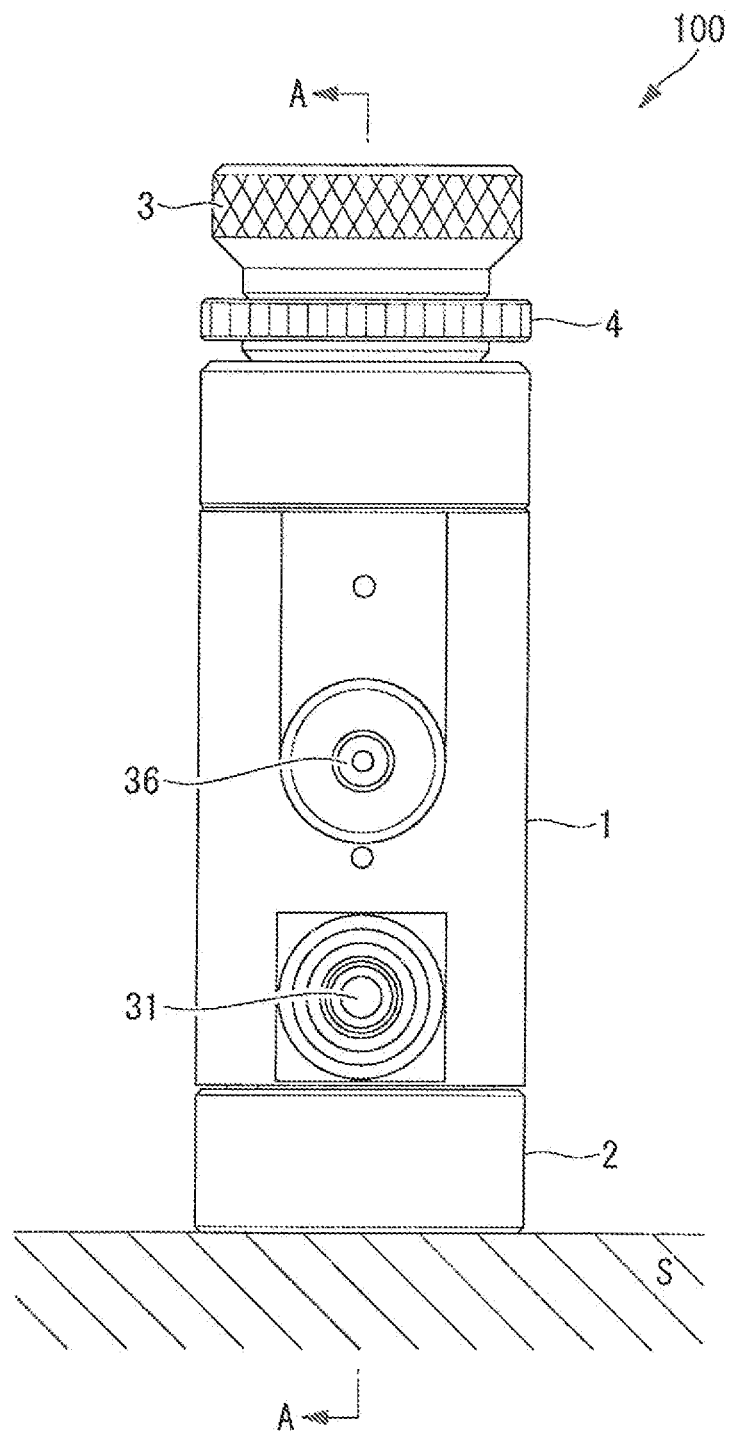
FIG. 1 is a front view of a flow regulating apparatus according to a first embodiment.
Figure 2:
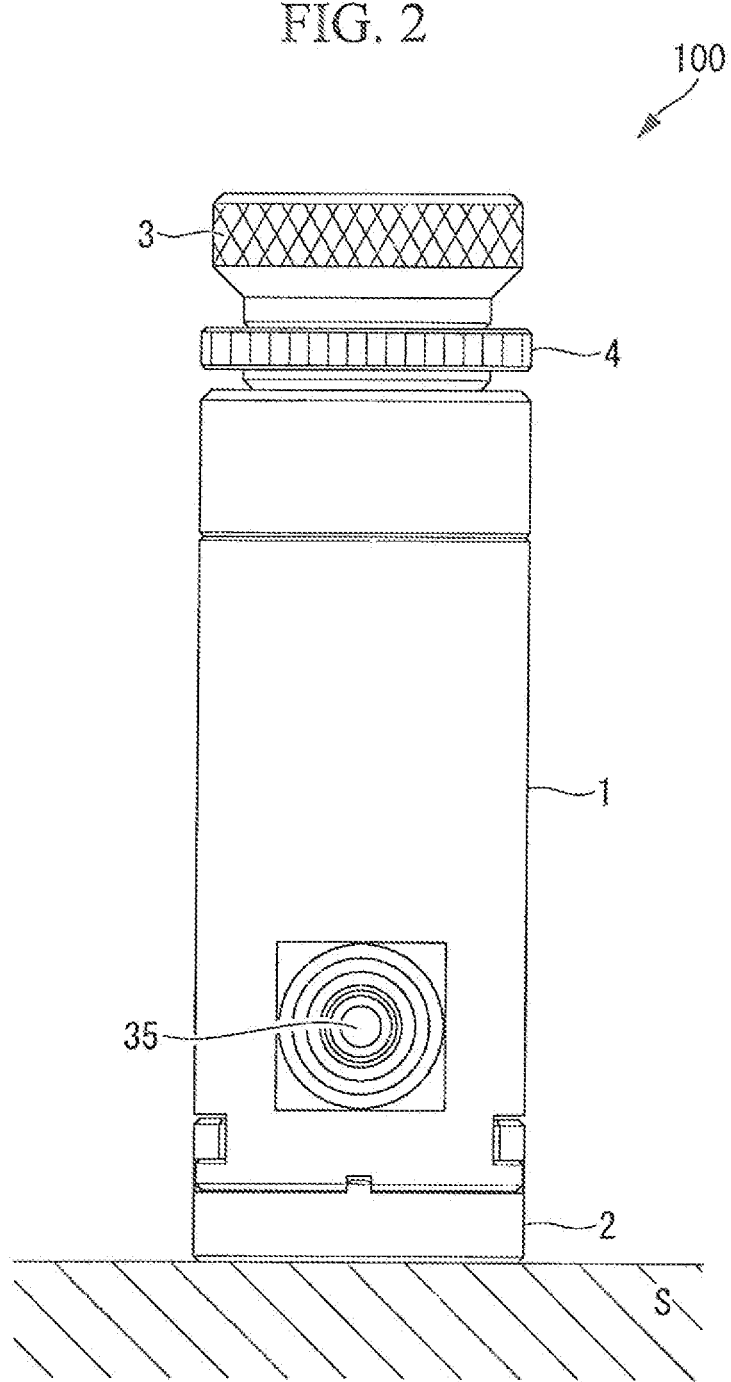
FIG. 2 is a rear view of the flow regulating apparatus according to the first embodiment.
Figure 3:
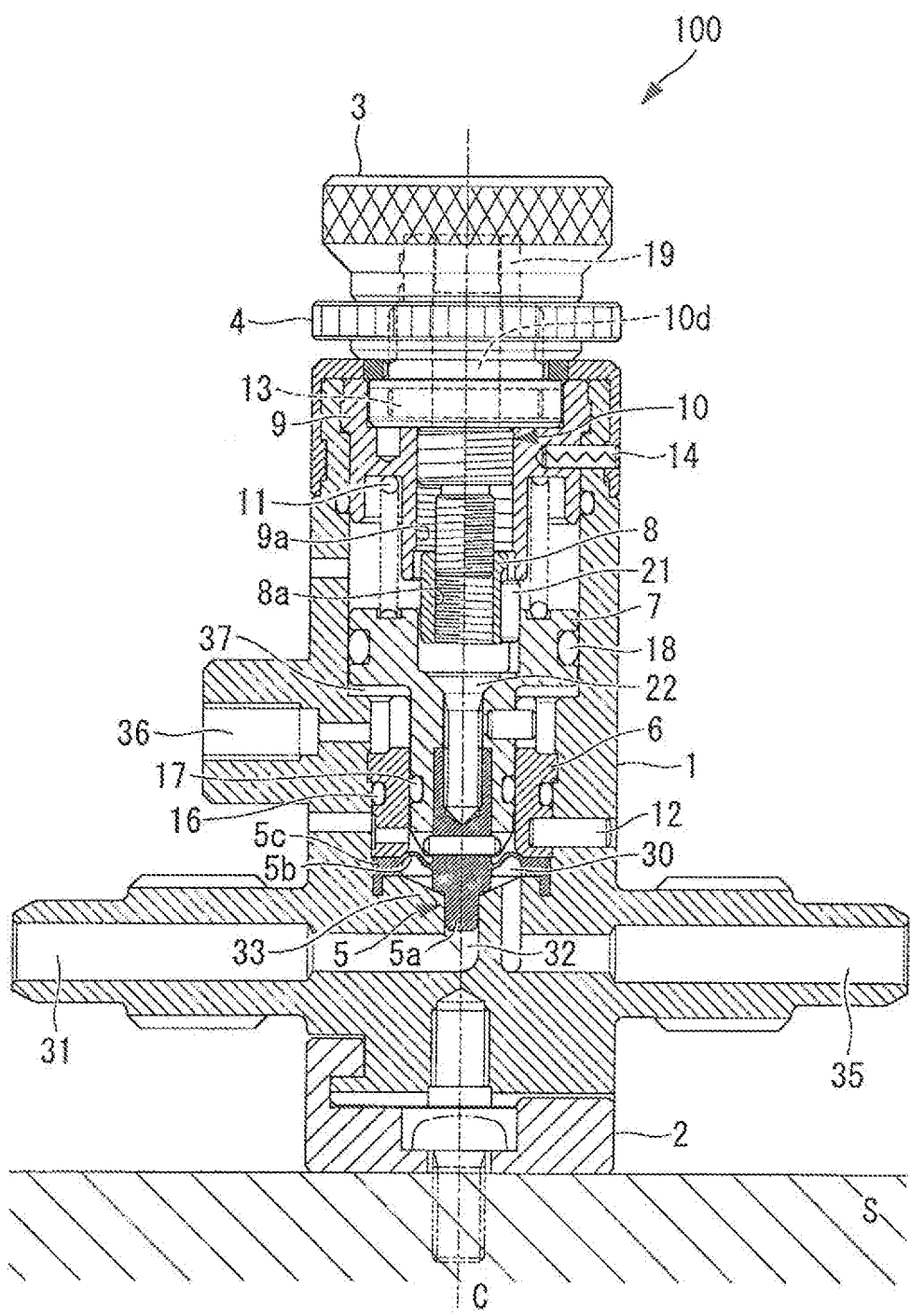
FIG. 3 is a partial sectional view on arrow A-A of the flow regulating apparatus shown in FIG. 1 in a fully-closed state.
Figure 4:
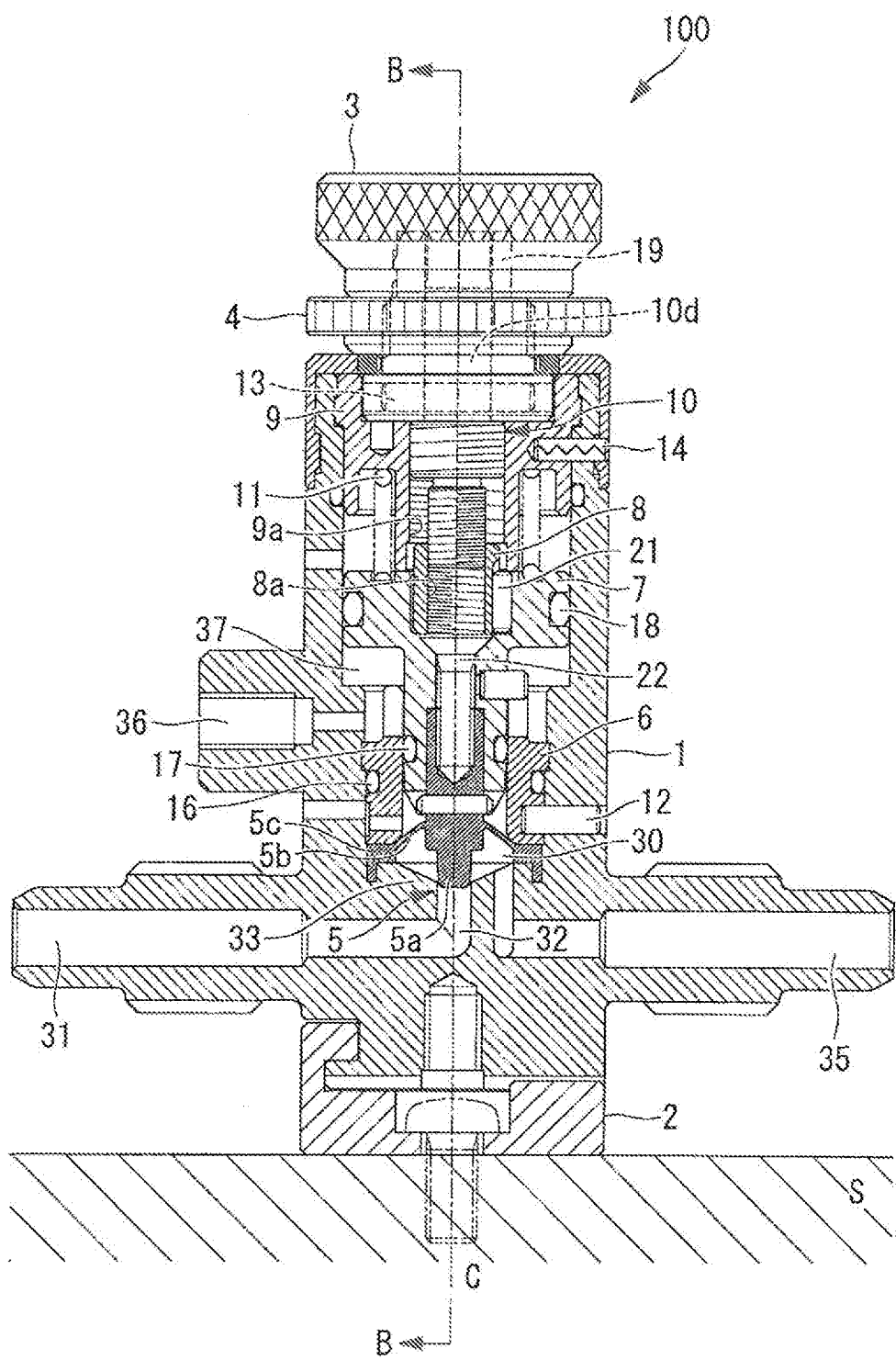
FIG. 4 is a partial sectional view on arrow A-A of the flow regulating apparatus shown in FIG. 1 in a fully-open state.

In the following, a flow regulating apparatus 100 according to a first embodiment of the present disclosure is described based on the drawings. FIG. 1 is a front view of the flow regulating apparatus 100 according to the first embodiment of the present disclosure. FIG. 2 is a rear view of the flow regulating apparatus 100 according to the first embodiment of the present disclosure. FIG. 3 is a sectional view on arrow A-A of the flow regulating apparatus 100 shown in FIG. 1 in a fully-closed state. FIG. 4 is a sectional view on arrow A-A of the flow regulating apparatus 100 shown in FIG. 1 in a fully-open state.

The flow regulating apparatus 100 shown in FIG. 1 is a device installed in a pipe channel for a fluid (chemical solution, pure water, etc.) for use in a semiconductor manufacturing apparatus or the like. The flow regulating apparatus 100 includes a body 1 (a main body section), a base section 2, a flow regulation knob 3 (a knob section), and a locknut 4. An operation port 36 is formed in the body 1. An inflow channel 31 is a channel that guides a fluid flowing from an upstream-side pipe (not shown) outside of the flow regulating apparatus 100 into the flow regulating apparatus 100.

As shown in FIG. 2, an outflow channel 35 that guides the fluid inside the flow regulating apparatus 100 to a downstream-side pipe not shown) is provided in a rear surface of the flow regulating apparatus 100.

As shown in FIGS. 1 and 2, the flow regulating apparatus 100 is installed on an installation surface S. The base section 2 is fixed to the installation surface S. The body 1 is removably attached to the base section 2.

Next, an inner structure of the flow regulating apparatus 100 is described by use of FIGS. 3 and 4.

FIG. 3 is a partial sectional view on arrow A-A when the flow regulating apparatus 100 shown in FIG. 1 is in a fully-closed state. FIG. 4 is a partial sectional view on arrow A-A when the flow regulating apparatus 100 shown in FIG. 1 is in a fully-open state. The flow regulating apparatus 100 of the first embodiment is a normal close-type air pressure regulation valve that comes into a closed state when no compressed air is supplied into a pressure chamber 37 through the operation port 36.

As shown in FIGS. 3 and 4, the body 1 is a member made of resin for receiving a flow regulating mechanism (a flow regulating section) that vertically moves a diaphragm needle 5 (a valve body section) into contact with or away from a valve seat section 33. The flow regulating mechanism includes a piston section 7, a moving body 8 (a moving member), a cover section 9 (the main body section), a screw rod 10 (a rod member), and a spring 11 (a spring section) described below.

The flow regulating mechanism controls a flow rate of a fluid flowing into a valve chamber 30 from a valve hole 32 by adjusting an insertion amount of a needle portion 5a (a projection portion) into the valve hole 32. The needle portion 5a provided at a distal end of the diaphragm needle 5 can be inserted into the valve hole 32. The inflow channel 31 for a fluid and the valve chamber 30 communicate with each other through the valve hole 32. The main body section including the body 1 and the cover section 9 forms the valve chamber 30 in which the diaphragm needle 5 is housed. The flow regulating mechanism is received in the main body section.

The diaphragm needle 5 is provided with a diaphragm portion 5b, which isolates the fluid channel from another portion. The diaphragm portion 5b is a thin film member having an annular shape in plan view. The diaphragm portion 5b is deformed according to movement of the needle portion 5a in a direction of a center axis C.

The diaphragm needle 5 is provided with an annular edge portion 5c. The annular edge portion 5c is a member having an annular shape in plan view. A projection portion extending in a circumferential direction is provided downwardly from an outer circumferential side edge portion of the annular edge portion 5c. The projection portion is inserted into a groove portion having an annular shape in plan view provided in the body 1. An upper surface of the outer circumferential-side edge portion of the annular edge portion 5c is in contact with a diaphragm support section 6. The annular edge portion 5c is fixed to the body 1 with the upper surface of the outer circumferential-side edge portion of the annular edge portion 5c pressed by the diaphragm support section 6.

The valve chamber 30 has a circular shape in plan view along the center axis C. The diaphragm needle 5 including the needle portion 5a is housed in the valve chamber 30. The valve chamber 30 is a space defined by a fluid contact surface of the diaphragm needle 5 and the valve seat section 33 as a fluid contact surface of the body 1. A center axis of the valve chamber 30 is aligned with the center axis C of the diaphragm needle 5.

The valve seat section 33 has a tapered shape where a distance from the center axis C is gradually increased at a constant gradient as it recedes from the valve hole 32 in the direction of the center axis C of the valve chamber 30. One end of the valve seat section 33 is connected to a valve hole edge portion as an end portion of the valve hole 32, and the other end of the valve seat section 33 is connected to the annular edge portion 5c and the diaphragm portion 5b of the diaphragm needle 5.

The flow regulating apparatus 100 comes into a blocked state in which the fluid flow into the valve chamber 30 from the valve hole 32 is blocked in the state shown in FIG. 3. When an air pressure supplied to the pressure chamber 37 is increased from the blocked state shown in FIG. 3, the diaphragm needle 5 is separated from the valve seat section 33. When the diaphragm needle 5 is separated from the valve seat section 33, the fluid flows into the valve chamber 30 from the valve hole 32. The fluid flowing into the valve chamber 30 flows into the outflow channel 35 through an opening portion provided in the valve chamber 30, and flows out of the flow regulating apparatus 100.

The diaphragm needle 5 is fastened to the piston section 7 by a fastening screw 22 so as to vertically move together with the piston section 7 it the direction of the center axis C of the diaphragm needle 5. The body 1 (the main body section) is a member made of resin (e.g., polytetrafluoroethylene (PTFE)) in which the inflow channel 31 and the outflow channel 35 are formed. The body 1 includes a cylindrical portion for receiving the piston section 7. The diaphragm support section 6 is fixed to an inner surface of the cylindrical portion the body 1. The diaphragm support section 6 is a member that allows the piston section 7 to move in the direction of the center axis C. An inner circumferential surface of the diaphragm support section 6 has a diameter substantially equal to a diameter of an outer circumferential surface of the piston section 7.

An outer circumferential surface of the diaphragm support section 6 has a diameter substantially equal to a diameter of an inner circumferential surface of the body 1. The diaphragm needle 5 is fixed to the body 1 by insetting the diaphragm needle 5 into the body 1, and press-fitting the diaphragm support section 6 into the body 1. After the diaphragm needle 5 is fixed to the body 1, a rotation-stop pin 12 is inserted to prevent rotation of the diaphragm support section 6 around the center axis C with respect to the body 1.

An O-ring 16 is provided on the outer circumferential surface of the diaphragm support section 6. An O-ring 17 and an O-ring 18 are provided on the outer circumferential surface of the piston section 7. The O-rings 16, 17, and 18 have a function to prevent a corrosive gas from entering the flow regulating mechanism in addition to a normal seal function. The corrosive gas is produced when some of chemical solutions such as hydrofluoric acid and nitric acid permeate through the diaphragm portion 5b of the diaphragm needle 5.

The spring 11 gives an urging force in a direction to press the piston section 7 toward the installation surface S along the center axis C to the piston section 7. The spring 11 gives an urging force (a first urging force) in a direction to bring the diaphragm needle 5 close to the valve hole 32 to the diaphragm needle 5 via the piston section 7. Compressed air is supplied to the operation port 36 (an air introduction port) from an external air supply source (not shown). The compressed air flowing from the operation port 36 is supplied into the pressure chamber 37 defined by the piston section 7, the diaphragm support section 6, and the body 1.

An air pressure generated by the air supplied to the pressure chamber 37 is adjusted by the air supply source (not shown). When an upward force applied to the piston section 7 by the air pressure of the pressure chamber 37 is smaller than a downward force applied to the piston section 7 by the urging force (the first urging force) of the spring 11, the flow regulating apparatus 100 comes into a closed state in which the diaphragm needle 5 is in contact with the valve seat section 33 as shown in FIG. 3.

The air pressure of the pressure chamber 37 acts on the piston section 7 to give an urging force (a second urging force) in a direction to bring the piston section 7 away from the installation surface S along the center axis C to the piston section 7. A force in a direction to bring the diaphragm needle 5 away from the valve hole 32 is generated on the diaphragm needle 5 via the piston section 7 by the urging force.

When the air pressure of the pressure chamber 37 is increased to a level at which the urging force in the direction to bring the piston section 7 away from the installation surface S along the center axis C exceeds the urging force applied from the spring 11, the piston section 7 moves in the direction away from the installation surface S along the center axis C. When the piston section 7 moves as described above, the diaphragm needle 5 becomes separated from the valve seat section 33. The flow regulating apparatus 100 thereby comes into an open state in which the fluid flowing from the inflow channel 31 flows into the outflow channel 35.

The diaphragm needle 5 separated from the valve seat section 33 moves upwardly along the center axis C, and stops at a position where an upper surface of the fastening screw 22 fastened to the piston section 7 contacts a distal end portion of the moving body 8. Therefore, an opening degree of the diaphragm needle 5 in a fully-open state is adjusted by the position of the distal end portion of the moving body 8.

Figure 5:
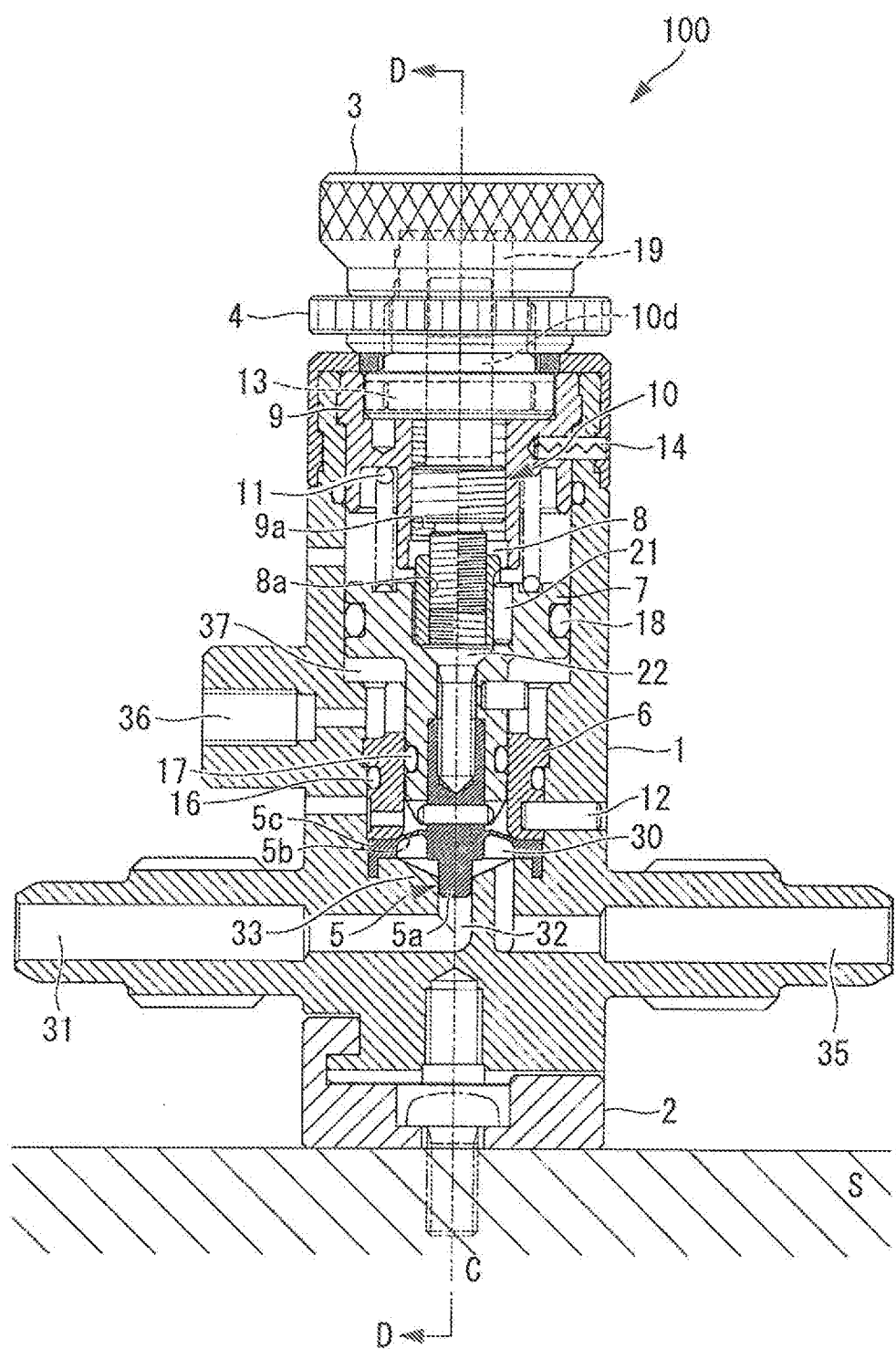
FIG. 5 is a partial sectional view on arrow A-A of the flow regulating apparatus shown in FIG. 1 in a partially-open state.
Figure 6:
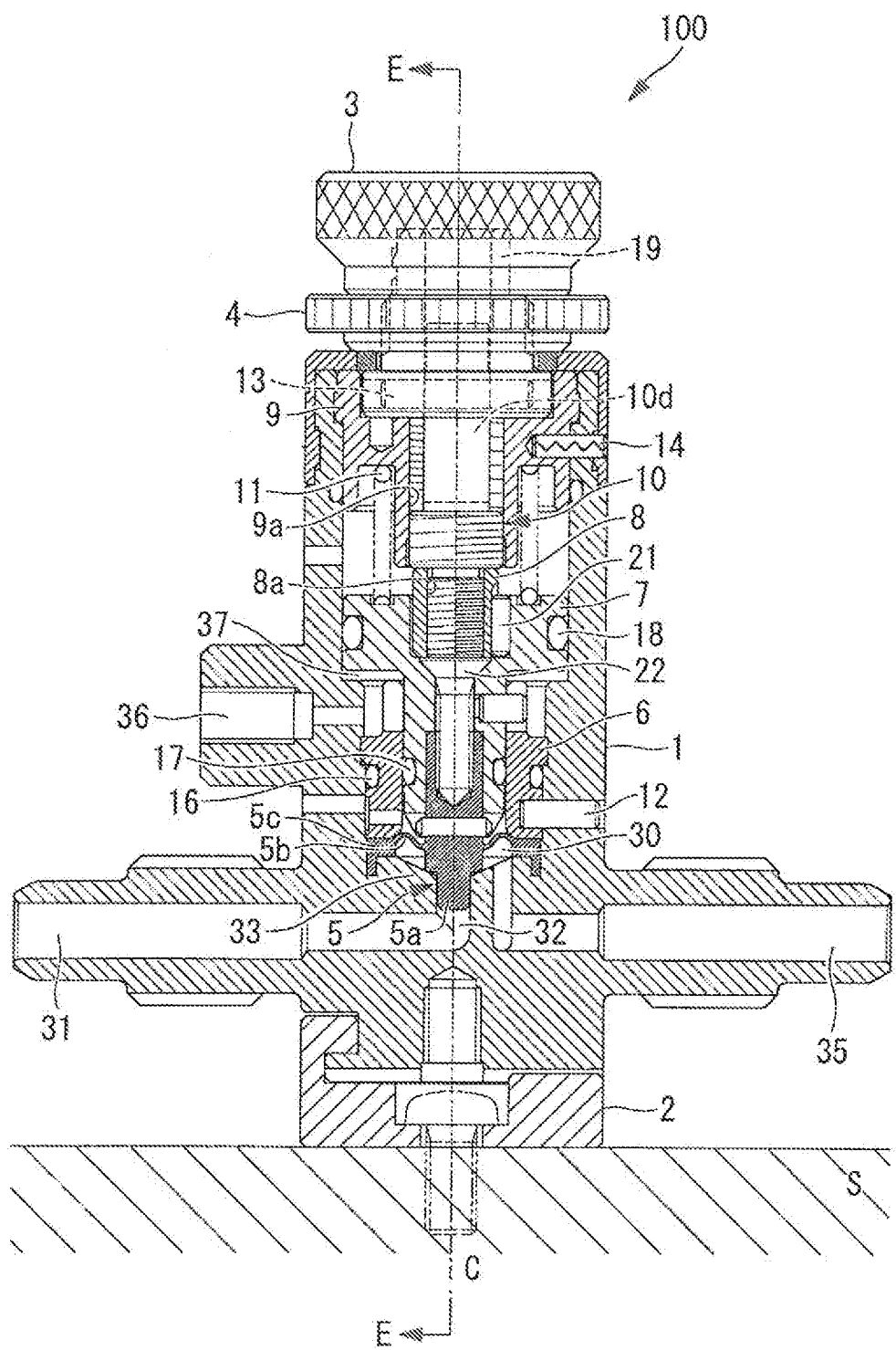
FIG. 6 is a partial sectional view on arrow A-A of the flow regulating apparatus shown in FIG. 1 in a partially-open state.
Figure 7:
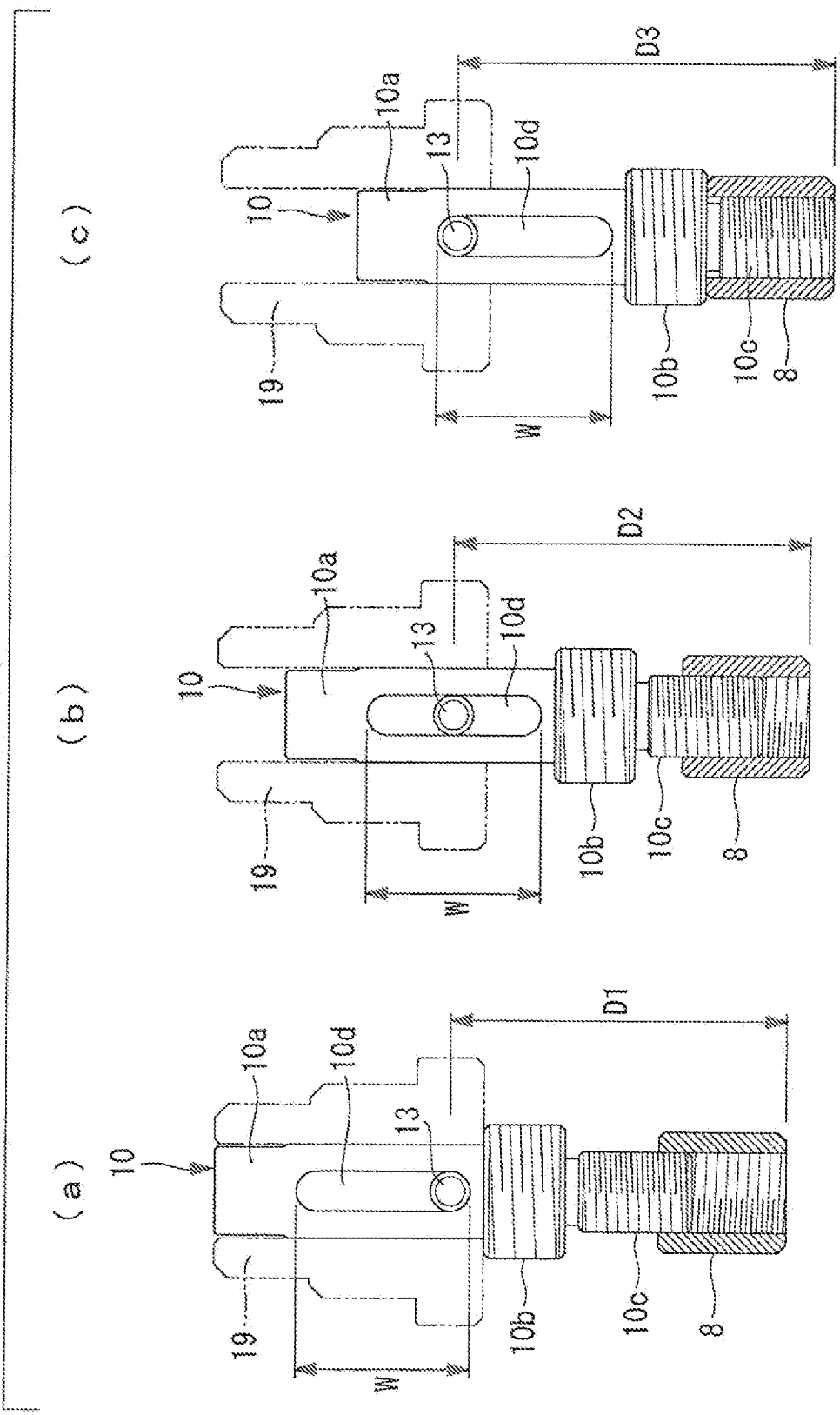
FIG. 7 show a screw rod and a moving body.
Figure 8:
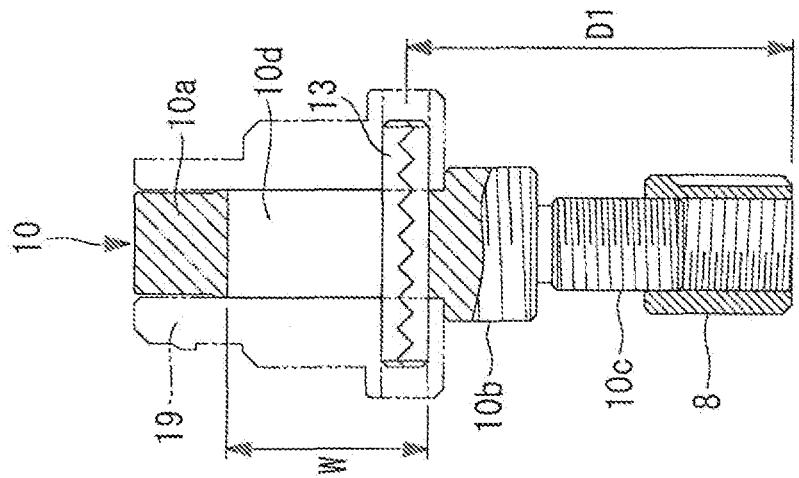
FIG. 8 show a screw rod and a moving body.

In the following, the adjustment of the opening degree of the diaphragm needle 5 when the flow regulating apparatus 100 is in the fully-open state is described by using FIGS. 4 to 8. FIGS. 4 to 6 are partial sectional views on arrow A-A of the flow regulating apparatus 100 shown in FIG. 1. The opening degree of the diaphragm needle is decreased in the order of FIG. 4, FIG. 5, and FIG. 6. FIGS. 7 and 8 are views illustrating the screw rod 10 and the moving body 8.

FIG. 7A is a view illustrating the screw rod 10 and the moving body 8 when the flow regulating apparatus 100 shown in FIG. 4 is viewed in a direction of an arrow B-B. FIG. 7B is a view illustrating the screw rod 10 and the moving body 8 when the flow regulating apparatus 100 shown in FIG. 5 is viewed in a direction of an arrow D-D. FIG. 7C is a view illustrating the screw rod 10 and the moving body 8 when the flow regulating apparatus 100 shown in FIG. 6 is viewed in a direction of an arrow E-E.

As shown in FIG. 7, the screw rod 10 includes a rod body 10a, a first male threaded portion 10b, and a second male threaded portion 10c. The rod body 10a, the first male threaded portion 10b, and the second male threaded portion 10c are integrally formed of a metal member such as stainless steel. As shown in FIGS. 3 to 6, the first male threaded portion 10b is arranged closer to the installation surface S than an upper surface of the cover section 9. Therefore, the first male threaded portion 10b and the second male threaded portion 10c are arranged within the body 1, thereby reducing the size of the flow regulating apparatus 100.

FIG. 8A is a partial sectional view of the screw rod 10 and the moving body 8 of the flow regulating apparatus 100 shown in FIG. 4. FIG. 8B is a partial sectional view of the screw rod 10 and the moving body 8 of the flow regulating apparatus 100 shown in FIG. 5. FIG. 8C is a partial sectional view of the screw rod 10 and the moving body 8 of the flow regulating apparatus 100 shown in FIG. 6. In FIG. 8, the rod body 10a and one portion of the first male threaded portion 10b are shown in section, and a remaining portion of the first threaded portion 10b, and the second threaded portion 10c are shown in appearance.

When the flow regulating apparatus 100 are in the fully-open state as shown in FIGS. 4 to 6, an upper surface of a recessed portion (the upper surface of the fastening screw 22) provided in a center portion of the piston section 7, and a lower surface (the distal end portion) of the moving body 8 come into contact with each other. Accordingly, the opening degree of the diaphragm needle 5 when the flow regulating apparatus 100 is in the fully-open state as shown in FIG. 4 is determined by the position of the lower surface of the moving body 8. In the present embodiment, the screw rod 10 is moved in the direction of the center axis C to adjust the position of the lower surface of the moving body 8. The opening degree of the diaphragm needle 5 (the insertion amount of the needle portion 5a into the valve hole 32) when the flow regulating apparatus 100 is in the fully-open state is thereby adjusted.

As shown in FIGS. 4 to 6, a spring roll pin 13 is fixed at a given height from the installation surface S on which the flow regulating apparatus 100 is installed. As shown in FIGS. 7 and 8, a distance D in the direction of the center axis C between the distal end portion of the moving body 8 fastened to a distal end of the screw rod 10 and the spring roll pin 13 is D1 in FIGS. 7A and 8A, D2 in FIGS. 7B and 8B, and D3 in FIGS. 7C and 8C, where there is a relationship of D1<D2<D3. Thus, the opening degree of the diaphragm needle 5 when the flow regulating apparatus 100 is in the fully-open state is largest in the flow regulating apparatus 100 shown in FIG. 4, intermediate in the flow regulating apparatus 100 shown in FIG. 5, and smallest in the flow regulating apparatus 100 shown in FIG. 6.

A mechanism in which the moving body 8 moves along the center axis C according to rotation of the screw rod 10 is described below.

The moving body 8 is a cylindrical member arranged coaxially with the diaphragm needle 5. A female threaded portion 8a is moving member threaded portion) is provided on an inner circumferential surface of the moving body 8. A recessed groove portion having a semi-circular shape in sectional view in a direction perpendicular to the center axis C is formed extending in a direction parallel to the center axis C in an outer circumferential surface of the moving body 8. A parallel pin 21 is arranged in the recessed groove portion in contact therewith.

A recessed groove portion having a semi-circular shape in sectional view in the direction perpendicular to the center axis C is formed extending in the direction parallel to the center axis C in an inner circumferential surface of the recessed portion provided in the center portion of the piston section 7. The parallel pin 21 is arranged in the recessed groove portion in contact therewith. The piston section 7 and the moving body 8 are restricted by the parallel pin 21 (a restriction member) so as not to relatively rotate around the center axis C.

The second male threaded portion 10c (a second threaded portion) of the screw rod 10 is fastened to the female threaded portion 8a provided on the inner circumferential surface of the moving body 8. The screw rod 10 includes the first male threaded portion 10b (a first threaded portion) and the rod body 10a in addition to the second male threaded portion 10c fastened to the moving body 8. The second male threaded portion 10c is arranged at a portion closer to the valve hole 32 than the first male threaded portion 10b (the distal end portion of the screw rod 10).

A through hole 10d penetrating in a direction substantially perpendicular to the center axis C is provided it the rod body 10a. The through hole 10d has a predetermined width W according to a moving range of the diaphragm needle 5 along the center axis C. The spring roll pin 13 (a pin member) is inserted into the through hole 10d. Both ends of the spring roll pin 13 are fixed to a hold section 19 (the knob section). The spring roll pin 13 is arranged so as to extend in the direction substantially perpendicular to the center axis C.

The hold section 19 is a cylindrical member capable of rotating around the center axis C. An outer circumferential surface of an upper end portion of the hold section 19 is coupled to an inner circumferential surface of the flow regulation knob 3. The flow regulation knob 3 and the hold section 19 are fixed to each other so as not to relatively rotate around the center axis C. Therefore, the flow regulation knob 3 and the hold section 19 constitute the knob section. When an operator of the flow regulating apparatus 100 holds the flow regulation knob 3 to rotate the flow regulation knob 3 around the center axis C, the hold section 19 also rotates around the center axis C. When the hold section 19 rotates around the center axis C, the spring roll pin 13 fixed to the hold section 19 also rotates around the center axis C. Since the spring roll pin 13 is inserted into the through hole 10d, the screw rod 10 rotates around the center axis C according to the rotation of the spring roll pin 13.

The first male threaded portion 10b of the screw rod 10 is fastened to a female threaded portion 9a (a body-side threaded portion) provided on an inner circumferential surface of the cover section 9. The cover section 9 is a cylindrical member arranged coaxially with the diaphragm needle 5. An outer circumferential surface of the cover section 9 is arranged in contact with the inner circumferential surface of the body 1. The cover section 9 is fixed to the body 1 so as not to rotate around the center axis C by a spring roll pin 14.

Next, a change in the position of the moving body 8 when the flow regulation knob 3 is rotated is described.

The flow regulation knob 3 is fixed to the screw rod 10 via the hold section 19 and the spring roll pin 13 as described above. Therefore, when the flow regulation knob 3 is rotated one revolution, the screw rod 10 rotates one revolution. When the screw rod 10 rotates one revolution, the first male threaded portion 10b and the second male threaded portion 10c also respectively rotate one revolutions.

Pitches of the first male threaded portion 10b and the second male threaded portion 10c (an axial distance in one revolution), respectively denoted by A and B, have a relationship of A>B. Thus, the pitch B of the second male threaded portion 10c is smaller than the pitch A of the first male threaded portion 10b.

A nominal diameter of the first male threaded portion 10b is larger than a nominal diameter of the second male threaded portion 10c. The nominal diameter of the first male threaded portion 10b is also larger than a diameter of the outer circumferential surface of the moving body 8 to which the second male threaded portion 10c is fastened.

When the flow regulation knob 3 is rotated one revolution such that the first male threaded portion 10b moves downwardly along the center axis C, the first male threaded portion 10b moves downwardly along the center axis C by a distance A. Since the second male threaded portion 10c is a member integrated with the first male threaded portion 10b, the second male threaded portion 10c also moves downwardly along the center C by the distance A similarly to the first male threaded portion 10b.

When the second male threaded portion 10c moves downwardly along the center axis C by the distance A, the moving body 8 moves downwardly along the center axis C by a distance of a difference (A–B) between the pitch A of the first male threaded portion 10b and the pitch B of the second male threaded portion 10c. The moving body 8 moves downwardly by the distance (A–B) since the pitch B of the second male threaded portion 10c is smaller than the pitch A of the first male threaded portion 10b, and the moving body 8 is prevented from rotating around the center axis C with respect to the piston section 7 by the parallel pin 21.

Similarly, when the flow regulation knob 3 is rotated one revolution such that the first male threaded portion 10b moves upwardly along the center axis C, the first male threaded portion 10b moves upwardly along the center axis C by a distance A. Since the second male threaded portion 10c is a member integrated with the first male threaded portion 10b, the second male threaded portion 10c also moves upwardly along the center axis C by the distance A similarly to the first male threaded portion 10b.

When the second male threaded portion 10c moves upwardly along the center axis C by the distance A, the moving body 8 moves upwardly along the center axis C by a distance of a difference (A–B) between the pitch A of the first male threaded portion 10b and the pitch B of the second male threaded portion 10c. The moving body 8 moves upwardly by the distance (A–B) since the pitch B of the second male threaded portion 10c is smaller than the pitch A of the first male threaded portion 10b, and the moving body 8 is prevented from rotating around the center axis C with respect to the piston section 7 by the parallel pin 21.

By providing the first male threaded portion 10b and the second male threaded portion 10c having different pitches in the screw rod 10 as described above, a moving amount of the moving body 8 in response to the rotation of the flow regulation knob 3 is decreased, so that the moving amount of the moving body 8 can be finely adjusted. When the position of the moving body 8 is adjusted by rotating the flow regulation knob 3, a moving range of the piston section 7 is determined. The opening degree of the diaphragm needle 5 in the fully-open state is thereby adjusted.

The diameter of the outer circumferential surface of the moving body 8 is smaller than a diameter of the inner circumferential surface of the cover section 9. Therefore, the moving body 8 is housed in a region of a gap between the inner circumferential surface of the cover section 9 and the screw rod 10, thereby reducing the size of the flow regulating apparatus 100.

A moving range of the moving body 8 in the direction of the center axis C is defined by the width W of the through hole 10d in the direction of the center axis C. As shown in FIGS. 7 and 8, the spring roll pin 13 contacts a lower end surface of the through hole 10d in FIGS. 7A and 8A. Therefore, the screw rod 10 cannot be further moved upwardly along the center axis C against the spring roll pin 13 having a fixed position relative to the installation surface S. Similarly, the spring roll pin 13 contacts an upper end surface of the through hole 10d in FIGS. 7C and 8C. Therefore, the screw rod 10 cannot be further moved downwardly along the center axis C against the spring roll pin 13 having a fixed position relative to the installation surface S.

After adjusting the position of the moving body 8 by rotating the flow regulation knob 3, the locknut 4 is fastened to fix the position of the moving body 8. The locknut 4 includes a female threaded portion fastened to a male threaded portion provided on an outer circumferential surface of the rod body 10a. When the locknut 4 is rotated to be moved downwardly (a direction to approach the cover section 9) in the direction of the center axis C, a lower surface of the locknut 4 and the upper surface of the cover section 9 come into contact with each other. When the lower surface of the locknut 4 and the upper surface the cover section 9 come into contact with each other, the flow regulation knob 3 is fixed so as not to rotate around the center axis C.

As described above, according to the flow regulating apparatus 100 of the present embodiment, when the flow regulation knob 3 is rotated around the center axis C of the diaphragm needle 5 according to an operation by an operator, the spring roll pin 13 fixed to the hold section 19 rotates around the center axis C. Since the spring roll pin 13 is inserted into the through hole 10d formed in the screw rod 10 that extends along the center axis C, the screw rod 10 rotates around the center axis C according to the rotation of the spring roll pin 13. Since the first male threaded portion 10b of the screw rod 10 is fastened to the female threaded portion 9a formed on the inner circumferential surface of the cover section 9, the screw rod 10 moves along the center axis C when the screw rod 10 rotates around the center axis C.

The screw rod 10 also includes the through hole 10d having the predetermined width W according to the moving range of the diaphragm needle 5 in the direction of the center axis C. Therefore, in a range in which the spring roll pin 13 does not contact an end portion of the through hole 10d in the direction of the center axis C, the screw rod 10 can be moved along the center axis C with the spring roll pin 13 fixed at a given position. When the screw rod 10 is moved in the direction of the center axis C, the insertion amount of the needle portion 5a provided at the distal end of the diaphragm needle 5 into the valve hole 32 is adjusted.

Accordingly, the flow rate can be regulated with the flow regulation knob 3 fixed at a given position. The flow regulating apparatus 100 with improved operability in flow regulation and with a reduced size can be thereby provided.

Second Embodiment

Figure 9:
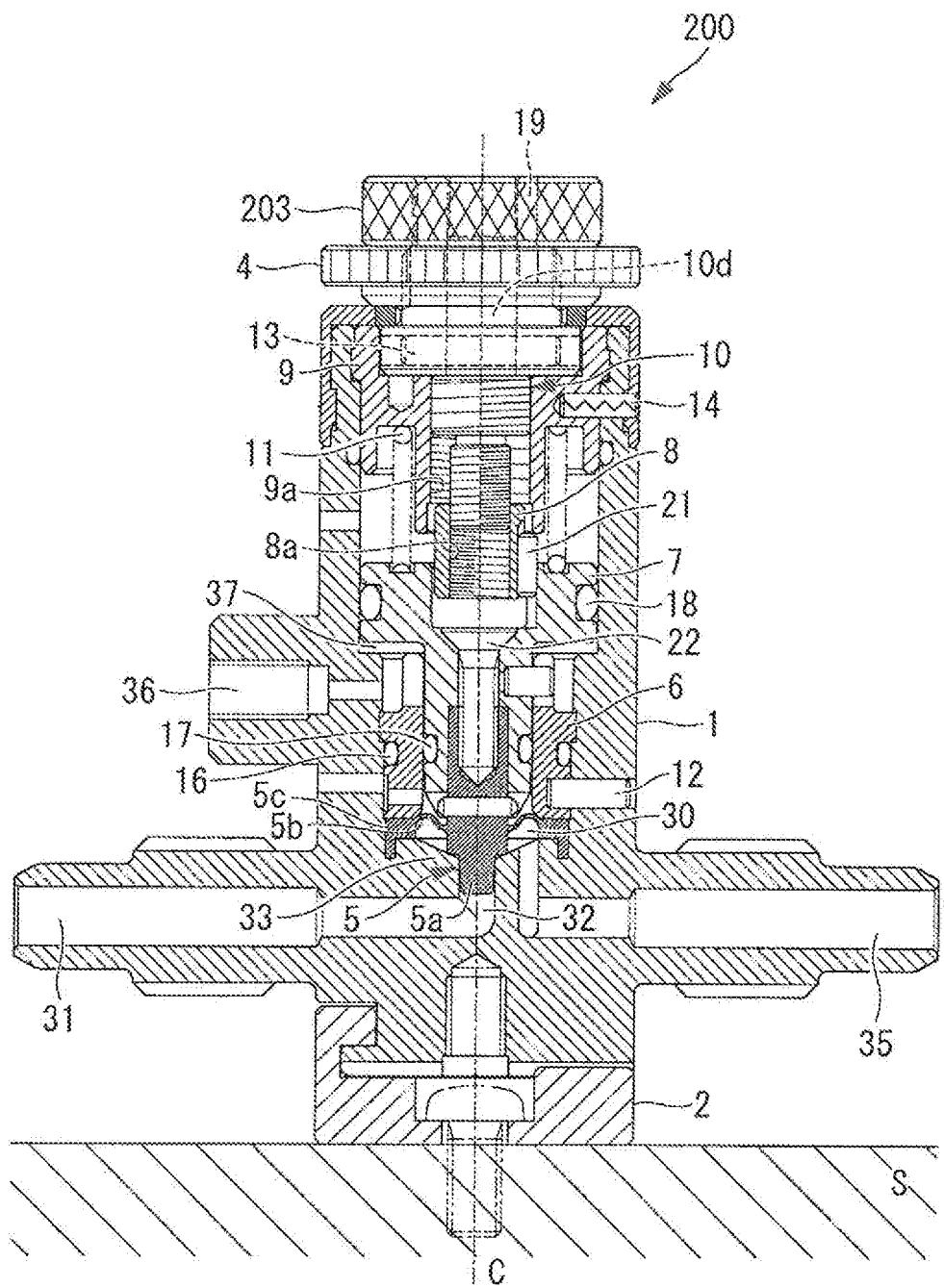
FIG. 9 is a partial sectional view of a flow regulating apparatus according to a second embodiment in a fully-closed state.

In the following, a flow regulating apparatus according to a second embodiment of the present disclosure is described based on the drawing. FIG. 9 is a vertical sectional view of a flow regulating apparatus 200 according to the second embodiment in a fully-closed state. The second embodiment is a modification of the first embodiment, and has the same configuration as the first embodiment except for the shape of the flow regulation knob. Since portions in FIG. 9 that are assigned the same reference numerals as those in FIG. 3 are the same as those in the first embodiment, description thereof is omitted.

The shape of the flow regulation knob differs between the flow regulating apparatus 200 of the second embodiment and the flow regulating apparatus 100 of the first embodiment. In the flow regulating apparatus 100 of the first embodiment, the flow control knob 1 has a shape covering an upper end portion of the screw rod 10 in the direction of the center axis C. The upper end portion of the screw rod 10 cannot be viewed from above the flow regulating apparatus 100.

Meanwhile, in the flow regulating apparatus 200 of the second embodiment, a flow regulation knob 203 has a shape not covering the upper end portion of the screw rod 10 in the direction of the center axis C. The upper end portion of the screw rod 10 can be viewed from above the flow regulating apparatus 200.

As described based on FIGS. 4 to 8 in the first embodiment, the position of the upper end portion of the screw rod 10 differs depending on the opening degree of the diaphragm needle 5. Therefore, since the flow regulation knob 203 has a shape not covering the upper end portion of the screw rod 10 in the direction of the center axis C, the opening degree of the diaphragm needle 5 can be visually checked.

Another Embodiment

Although the flow regulating apparatus is the normal close-type flow regulating apparatus in the first and second embodiments, another aspect may be employed. For example, a normal open-type flow regulating apparatus may be employed.

The present invention is not limited to the aforementioned embodiments, and may be changed as appropriate without departing from the scope of the invention.

The invention claimed is:

1. A flow regulating apparatus comprising:
a valve body section where a projection portion is provided at a distal end;
a main body section where a valve chamber and an air introduction port are formed, the valve chamber being formed so as to house the valve body section, the air introduction port being formed so as to introduce compressed air from outside;
a valve hole that allows the projection portion to be inserted therein, and brings an inflow channel for a fluid and the valve chamber into communication with each other;
a flow regulating mechanism that adjusts an insertion amount of the projection portion into the valve hole to regulate a flow rate of a fluid flowing into the valve chamber from the valve hole;
a piston section that is coupled to the valve body section, and is movable along a center axis along with the valve body section;
a spring section that gives a first urging force in a direction to bring the valve body section close to the valve hole via the piston section,
wherein the flow regulating mechanism includes
a knob section that rotates around the center axis of the valve body section according to an operation by an operator,
a rod member that extends along the center axis, and adjusts the insertion amount by moving along the center axis,
a pin member that is fixed to the knob section, and extends in a direction substantially perpendicular to the center axis, and
a moving member that is arranged coaxially with the valve body section, the moving member being a cylindrical shape,
the rod member including a first threaded portion that is fastened to a body-side threaded portion formed on an inner circumferential surface of the main body section, a second threaded portion that is fastened to a moving member threaded portion formed on an inner circumferential surface of the moving member at a distal end portion closer to the valve hole than the first threaded portion, and a through hole penetrating in the direction substantially perpendicular to the center axis and having a predetermined width according to a moving range of the valve body section along the center axis,
the pin member being inserted into the through hole, wherein a second urging force in a direction to bring the valve body section away from the valve hole is generated on the valve body section via the piston section by the compressed air introduced into a pressure chamber in communication with the air introduction port, the moving member and the piston section are separated from each other when the first urging force exceeds the second urging force, and the moving member and the piston section come into contact with each other when the second urging force exceeds the first urging force, and the piston section and the moving member are restricted by a restriction member so as not to relatively rotate around the center axis, the restriction member being arranged in contact with the piston section and the moving member.

2. The flow regulating apparatus according to claim 1, wherein a pitch of the second threaded portion being smaller than a pitch of the first threaded portion.

3. The flow regulating apparatus according to claim 2, wherein a diameter of an outer circumferential surface of the moving member is smaller than a diameter of the inner circumferential surface of the main body section.

4. The flow regulating apparatus according to claim 1, wherein a first recessed groove portion is formed extending in a direction parallel to the center axis in an outer circumferential surface of the moving member, a second recessed groove portion is formed extending in a direction parallel to the center axis in an inner circumferential surface of a recessed portion provided in the piston section, and the restriction member being arranged in contact with the first recessed groove portion and the second recessed groove portion.

* * * * *